United States Patent [19]

Skloss

[11] Patent Number: 4,504,209

[45] Date of Patent: Mar. 12, 1985

[54] TORTILLA MAKING APPARATUS

[76] Inventor: Louis C. Skloss, 4319 Irene, San Antonio, Tex. 78222

[21] Appl. No.: 556,838

[22] Filed: Dec. 1, 1983

[51] Int. Cl.³ .................... B29C 15/00; A21C 11/00; A21B 5/00

[52] U.S. Cl. .................................... 425/397; 99/353; 425/406

[58] Field of Search ............... 425/394, 395, 397, 384, 425/400, 406, 407, 436, 441; 99/349, 353

[56] References Cited

U.S. PATENT DOCUMENTS

| | | | |
|---|---|---|---|
| 2,980,012 | 4/1981 | Ramirez | 99/353 |
| 3,814,005 | 6/1974 | Widdel | 99/353 |
| 3,880,065 | 4/1974 | Stickle | 99/353 |
| 4,197,792 | 4/1980 | Mendoza | 99/349 |
| 4,281,593 | 8/1981 | Geuaert | 99/349 |
| 4,303,677 | 12/1981 | De Acetis | 99/349 |
| 4,446,775 | 5/1984 | Reed | 99/353 |

Primary Examiner—Willard E. Hoag
Attorney, Agent, or Firm—Cox & Smith Incorporated

[57] ABSTRACT

A tortilla making apparatus having first and second cooking and compressing surfaces reciprocally mounted relative to each other and a feeding means reciprocally mounted with the first surface for feeding dough to be heated and compressed and for ejecting finished tortillas.

11 Claims, 8 Drawing Figures

TORTILLA MAKING APPARATUS

BACKGROUND OF THE INVENTION

This invention relates generally to apparatus for making flour tortillas. In particular, the invention relates to an apparatus for forming flour tortillas and similar products under heat and pressure.

Tortillas are a staple food product in many areas of the United States. The increasing popularity of Mexican food restaurants has also increased the familiarity and demand for tortillas. Known U.S. patents relating to this area are U.S. Pat. Nos. 3,379,141 issued to Gorth, 4,197,792 issued to Mendoza, and 4,241,648 issued to Longenecker.

A tortilla making machine must be capable of taking a round ball of dough and forming it into a uniform disc. Generally the forming machine will also heat the tortilla so that it can be flattened and handled by a conveying mechanism.

It is an object of the present invention to provide a tortilla making machine which is much faster than hand-making tortillas yet which provides a unformly shaped tortilla which has similar characteristics to a hand-made tortilla. It is another object of the invention to provide a tortilla making machine which has few moving parts and is simple to operate. It is another object of the invention to provide a tortilla making machine that is structurally simple, reliable and inexpensive to build and operate. It is another object of the invention to provide a tortilla making machine which heats the tortillas as they are compressed to facilitate handling. Other objects of the invention will become apparent from the following detailed disclosure.

SUMMARY OF THE INVENTION

The invention discloses a combination feeding ejector mechanism which feeds balls of dough to a heated compression section. The balls of dough are uniformly compressed into tortillas and are heated to facilitate handling. The feeding mechanism ejects a heated tortilla from the compression section as it feeds a new ball of dough into the compression section. The compression section is adjustable to provide a uniformly shaped tortilla. The thickness as well as the diameter may be varied by adjustments.

BRIEF DESCRIPTION OF THE PREFERRED EMBODIMENTS

Figure 1:
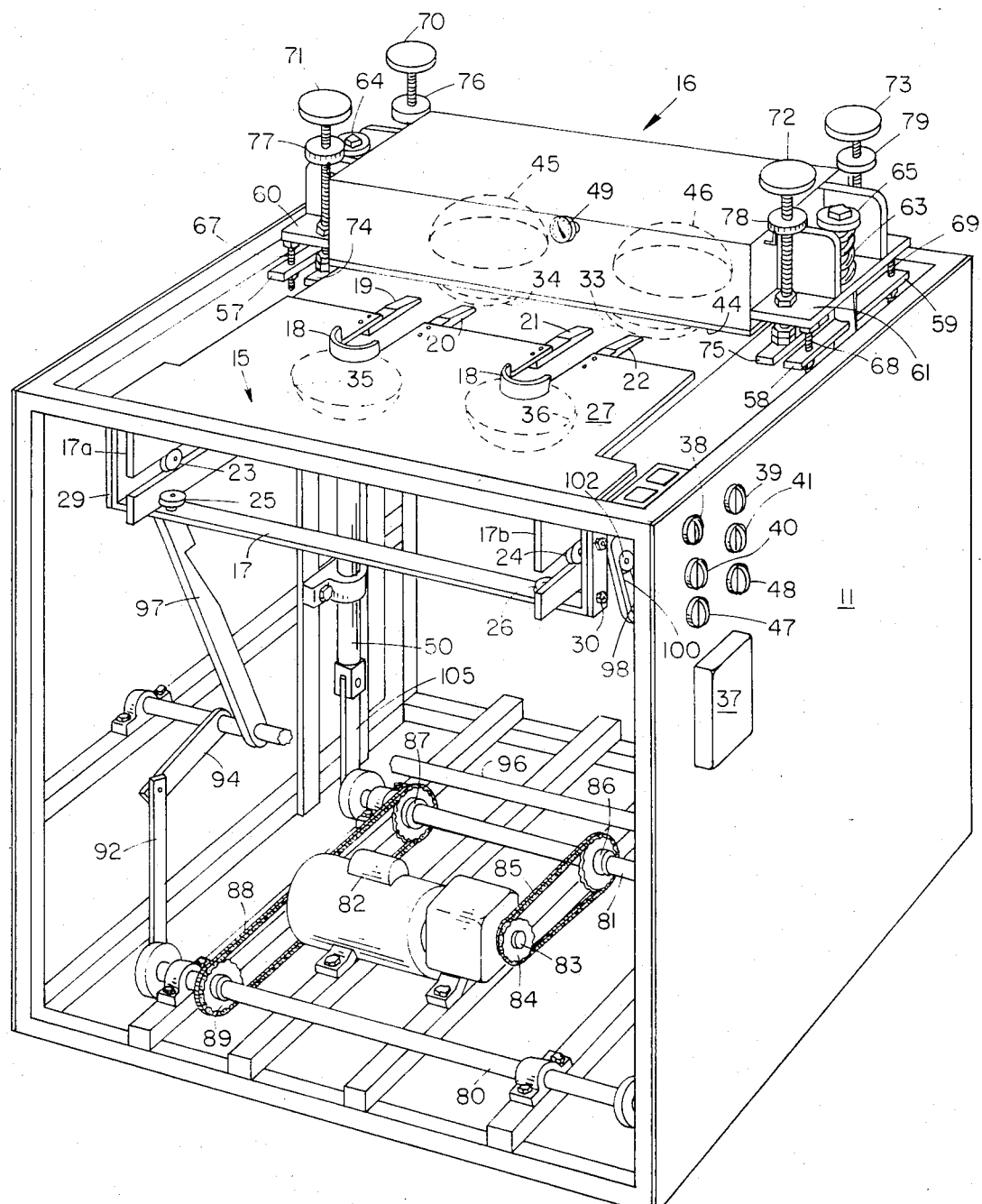
FIG. 1 is a partial perspective view showing a panel of the cabinet of the apparatus removed.
Figure 2:
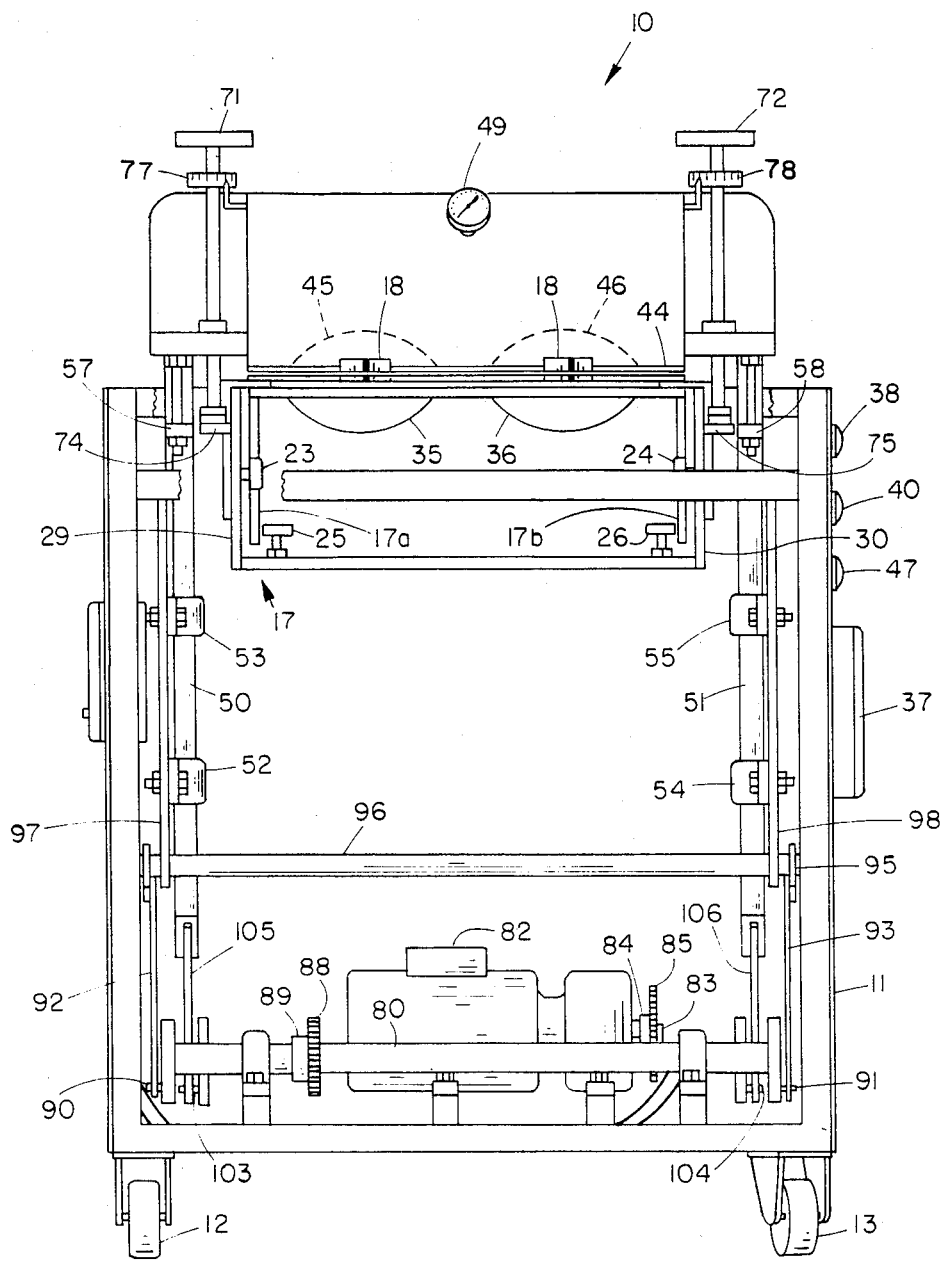
FIG. 2 is a side elevation view showing a panel of the cabinet removed.
Figure 3:
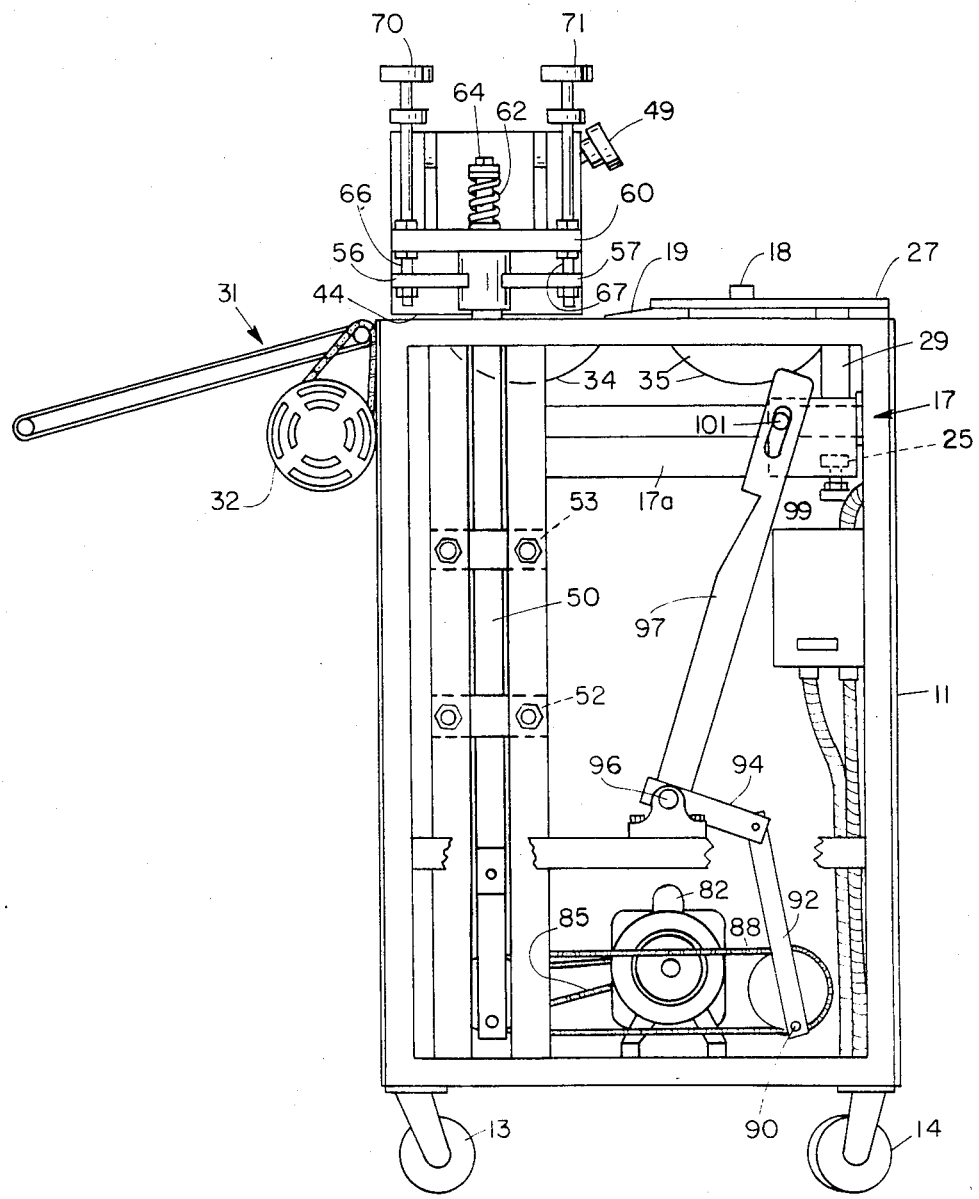
FIG. 3 is a side elevation view showing a panel of the cabinet removed.

Referring to FIG. 1 of the drawing there is shown a tortilla making apparatus 10. The apparatus 10 includes a cabinet 11. The cabinet 11 is mounted upon wheels 12, 13 and 14 for rolling into position. Another wheel (not shown) positioned behind the wheel 12 in FIG. 2 and the wheel 14 in FIG. 3, is also provided. The apparatus includes a feeder ejector mechanism 15 and a compressing and heating mechanism 16. The feeder and ejector mechanism 15 is connected with a slide mechanism 17 which is slidably supported by the ejector fingers 19, 20, 21 and 22 and tracks 17a and 17b. The slide mechanism 17 includes slide rollers 23, 24, 25 and 26 which guide the slide mechanism and support it in tracks 17a and 17b as it reciprocates back and forth as shown in FIGS. 5a, 5b, 5c and 5d. Feeders 18 are provided to move balls of dough under the mechanism 16.

The feeder ejector mechanism 15 includes a slide means 27 which is spaced from the lower feeding and compressing surface 28. The rear portion of the slide means 27 is supported by the vertical members 29 and 30. The front portion of the slide means 27 is supported on the flat cooking and compressing surface 28 by the ejector fingers 19, 20, 21 and 22. Preferably the ejector fingers are made of a teflon material which is self-lubricating. As shown in FIG. 3, the ejector fingers include an inclined portion which engages and slides under a compressed tortilla as shown in FIG. 5d to partially lift and remove it from the surface 28 where it is delivered to an endless conveying mechanism 31 which is driven by motor 32. The tortilla is lifted upwardly rather then merely pushing of the tortilla off the surface 28. Heating elements 33, 34, 35 and 36 are provided in the lower heating and compression surface 28 to heat the balls of dough to facilitate forming and handling. The heating elements are preferably electric and a control box 37 is provided to turn the heating elements on and off and control knobs 38, 39, 40 and 41 are provided to regulate the temperature. The heating elements heat the surfaces that contact the balls of dough to facilitate expansion of the dough to form a tortilla and to inhibit sticking of the dough during compression and ejection. Also the heating of the tortillas also facilitates handling of the tortillas.

Figure 4:
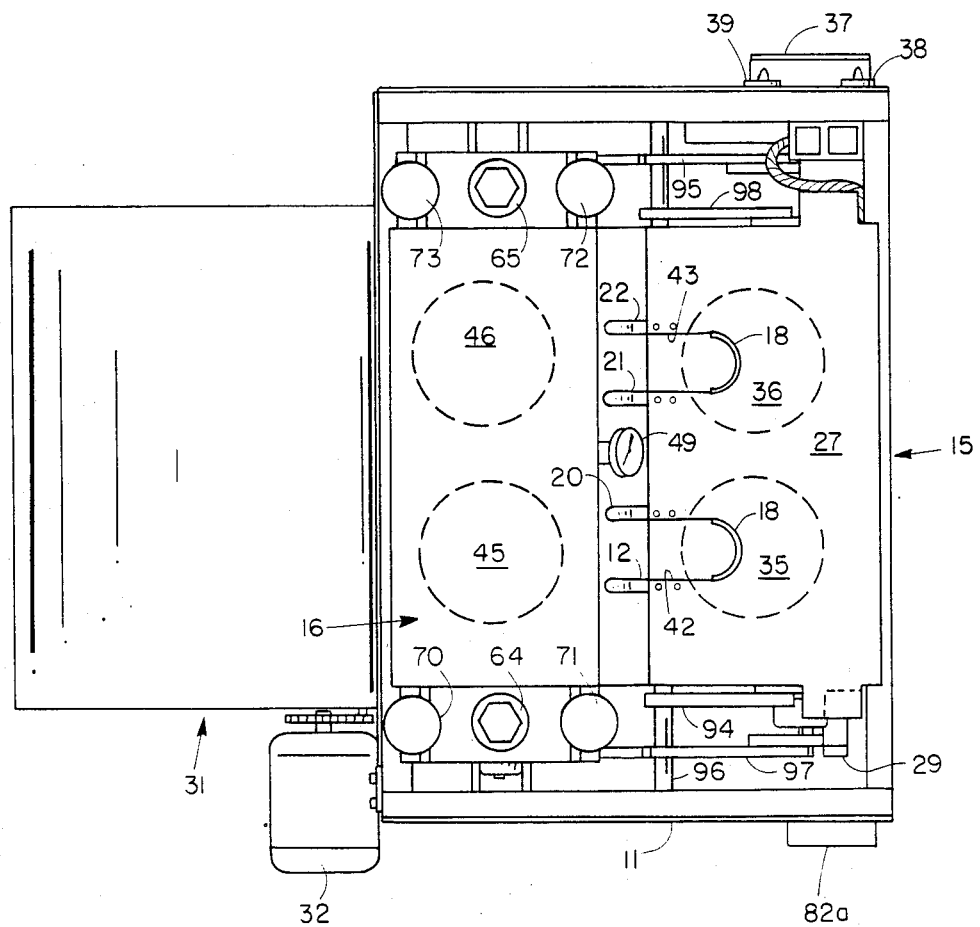
FIG. 4 is a plan view of the apparatus.

As shown in FIG. 4, slots 42 and 43 are provided for positioning balls of dough. The feeders 18 are semi-circular in shape and extend above and below the slide means 27 and are slightly spaced from the surface 28. This facilitates movement of a ball of dough from the position shown in FIG. 5a to the position shown in FIG. 5b for compression.

The compression and heating mechanism 16 is reciprocally mounted and includes a flat, horizontal compressing surface 44. Heating elements 45 and 46 are provided to heat the tortillas. Control knobs 47 and 48 are provided to regulate the temperature of the heating elements 45 and 46. A temperature gauge 49 may be provided to sense the temperature of the heating elements.

The mechanism 16 is mounted for reciprocating movement on vertical reciprocating rods 50 and 51. The rods 50 and 51 are mounted in slide journals 52, 53, 54 and 55 which are secured to the frame members of the cabinet 11.

Secured to the upper ends of the rods 50 and 51 are horizontal beams 56, 57, 58 and 59. Reciprocally mounted upon the rods 50 and 51 are support members 60 and 61 which support the compression and heating mechanism 16. Compression springs 62 and 63 press against the cap bolts 64 and 65 and the support members 60 and 61. The cap bolts 64 and 65 can vary the compression in springs 62 and 63 when they are screwed downwardly. A plurality of spring compression adjusting and dwell time bolts 66, 67, 68 and 69 are threadably received by threaded apertures in horizontal beams 56, 57, 58 and 59. Locking nuts are provided on the lower ends of the bolts 66, 67, 68 and 69 to prevent them from turning. As will be apparent, the heads of the bolts 66-69 engage the lower surface of support members 60 and 61. Accordingly, when the lock nuts are loosened the bolts 66-69 can be rotated which will vary the distance between the support members 60-61 and the horizontal beams 56-59 to vary the compression of the springs 62 and 63 and to set the dwell time of the compressing mechanism 16. This determines the amount of compression exerted by the compression surface 44 against a ball of dough being compressed on the surface 28 which in turn determines the amount of pressing of the tortilla as shown in FIG. 5c. This also determines the amount of dwell time of the compression surface 44 during formation and flattening of a tortilla.

The lower limit of travel of the mechanism 16 is controlled by the adjusting screws 70, 71, 72 and 73 which are threadably received in threaded apertures in the support members 60 and 61. Lock nuts are provided on the adjusting screws 70-73 to prevent their rotation in the threaded apertures in the support members 60 and 61. The lower ends of the adjusting screws 70-73 engage rigid stop bars 74 and 75 which limits downward movement of the surface 44 relative to the surface 28. Calibrating means 76, 77, 78 and 79 are fixedly secured to the adjusting screws 70, 71, 72 and 73 and include markings thereon which indicate the spacing between the surface 44 and surface 28. During reciprocation of the rods 50 and 51, the lower ends of adjusting screws 70, 71, 72 and 73 move downwardly to engage the stop bars 74 and 75 which limits downward travel. The downward movement of the rods 50 and 51 will compress the springs 62 and 63 to fully compress a ball of dough beneath the compressing surfaces and to allow a loss motion connection and provide the dwell time to complete formation of a flat tortilla. Additional compression occurs in the springs 62 and 63 after the compression mechanism 16 moves downwardly and engages balls of dough under the surface 44. By adjusting the compression in the springs 62 ad 63 with the bolts 66-69 and the cap bolts 64 and 65 and by adjusting the screws 70-73 the amount of compression applied to a ball of dough to form a tortilla can be varied.

The drive mechanism for the feeder and ejector mechanism 15 and compression and heating mechanism 16 includes horizontal rotating drive shafts 80 and 81 which are rotatably mounted in bearing journals attached to the frame of the cabinet. An electric motor 82 includes an output shaft 83 to which is attached a chain sprocket 84. A chain 85 drives another chain sprocket 86 which rotates the drive shaft 81. A chain sprocket 87 drives chain 88 which in turn drives chain sprocket 89 which rotates drive shaft 80. Eccentric drive pins 90 and 91 are mounted on the drive shaft 81. Drive bars 92 are pivotably mounted upon the eccentric drive pins 90 and 91 and are pivotably connected to bars 94 and 95. The bars 94 and 95 are rigidly connected to rocking drive shaft 96 which is mounted in journal bearings on the frame of the cabinet 11. Rigidly connected to the drive shaft 96 are rocking bars 97 and 98. Bars 94 and 97 and 95 and 98 form crank arms. Longitudinally extending slot 99 and 100 slidably receive rollers 101 and 102 which are fixedly secured to the slide mechanism 17. As will be apparent, operation of the motor 82 by turning on the switch 82a will cause the drive shafts 80 and 81 to rotate which will in turn rock the drive shaft 96. The reciprocating movement of the rocking bars 97 and 98 will provide the sliding movement of the feeder and ejector machanism 15 as best shown in FIGS. 5a, 5b, 5c and 5d.

Eccentric drive pins 103 and 104 are rotatably mounted on the drive shaft 81. Pivotably connected to the eccentric drive pins 103 and 104 are drive bars 105 and 106. The drive bars 105 and 106 are in turn pivotably connected to the rods 50 and 51. As shown in FIGS. 5a, 5b, 5c, and 5d, rotation of the drive shaft 81 will in turn rotate the eccentric drive pins 103 and 104 which will reciprocate the drive bars 105 and 106. This in turn reciprocates the rods 50 and 51 to operate the compression and heating mechanism 16.

Figure 5A:
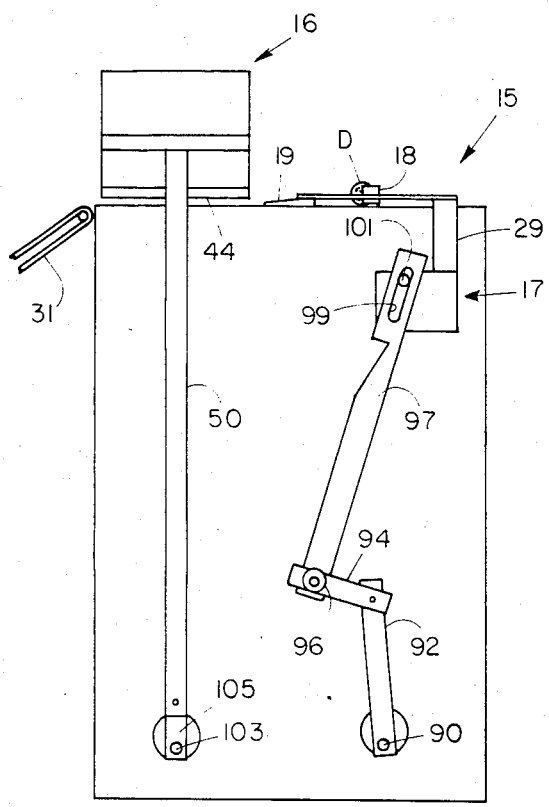
FIG. 5a is a schematic view showing the mechanism positioned prior to feeding dough into the compression section.
Figure 5B:
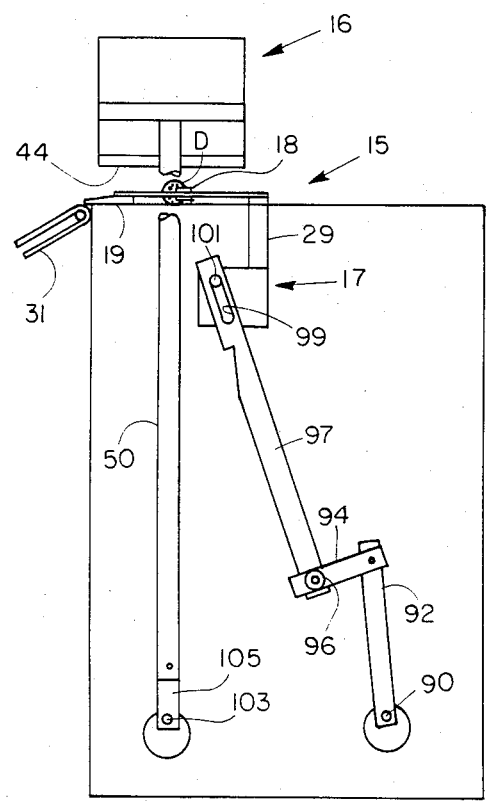
FIG. 5b is a schematic view showing the dough having been positioned in the compression section.
Figure 5C:
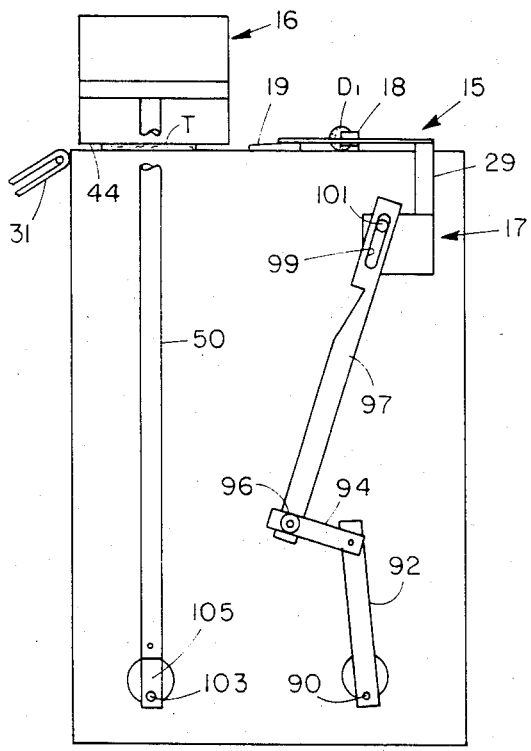
FIG. 5c shows the compression section forming a tortilla and another piece of dough in position to be moved to the compression section.
Figure 5D:
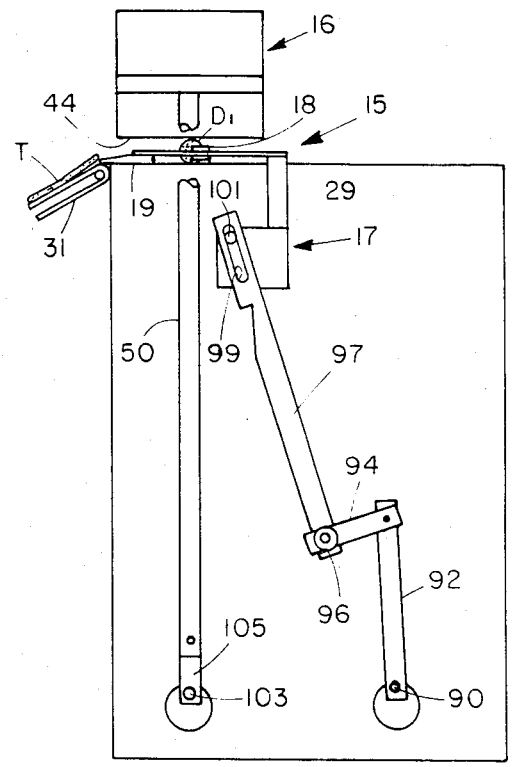
FIG. 5d shows the other ball of dough being positioned in the compression section and the tortilla being ejected from the compression section.

The operation of the invention is best shown in FIGS. 5a, 5b, 5c and 5d. The apparatus is turned on by turning on the heating elements and the motor 82. After the surfaces 28 and 44 reach the desired temperature, a ball of dough D as shown in FIG. 5a is positioned to engage the feeders 18. The feeders and ejector mechanism 15 is driven forward to position the ball of dough D under the compression surface 44. Continued rotation of the shaft 80 moves the feeders and ejector mechanism 16 to the position shown in FIG. 5c where a ball of dough D' is positioned in front of the feeders 18. As soon as the feeders and ejector mechanism 15 is moved out from under the compression surface 44 it moves downwardly to compress the dough to form a tortilla T. During the next cycle of the machine the ball of dough D' is positioned under the compression surface 44 and the tortilla T is moved off onto the conveyor mechanism 31 by the inclined surfaces of the ejector fingers 19, 20, 21 and 22. This operation is continued as long as balls of dough are positioned within the feeders 18.

Although the invention has been described in conjunction with the foregoing specific embodiment, many alternatives, variations and modifications will be apparent to those of ordinary skill in the art. Those alternatives and modifications are intended to fall within the spirit and scope of the appended claims.

I claim:
1. An apparatus for molding tortillas comprising:
   a first compressing means having a flat compressing surface;
   a second compressing means having a flat compressing surface which is reciprocally mounted with the first compressing means for molding a tortilla between the surfaces;
   feeding means reciprocally mounted with the first surface means for feeding dough to be compressed by the first and second means and for ejecting tortillas therefrom;
   drive means for reciprocating the second compressing means and reciprocating the feeding means; and
   the drive means including adjusting means to predetermine the thickness and diameter of a tortilla and the dwell time of the second compressing means after a ball of dough is flattened to form a tortilla.
2. The apparatus as set forth in claim 1, wherein:

the compressing means include heating means to heat the compressing surface to facilitate compressing and ejecting of the tortillas.

3. The apparatus as set forth in claim 1, wherein:
the adjusting means includes adjustable stop means to control the closest approach of the second compressing means to the first compressing means.

4. The apparatus as set forth in claim 1, wherein:
the feeding means includes feeders to move balls of dough to the compressing means.

5. The apparatus as set forth in claim 4, wherein:
the feeding means includes ejector fingers which eject flat tortillas from the compressing means.

6. The apparatus as set forth in claim 5, wherein:
the ejector fingers slide on the compressing surface of the second compressing means.

7. The apparatus as set forth in claim 1, wherein:
the drive means includes synchronized eccentric means to reciprocate the first and second surfaces.

8. The apparatus as set forth in claim 7, wherein:
the drive means includes a vertically mounted reciprocating rod connected with one of the eccentric means to reciprocate the second flat compressing means.

9. The apparatus as set forth in claim 8, wherein:
the second compressing means includes spring means to permit relative movement between the second compressing means and the reciprocating rod.

10. The apparatus as set forth in claim 8, wherein:
the drive means includes a reciprocating crank arm connected with the other of the eccentric means to reciprocate the feeding means.

11. The apparatus as set forth in claim 10, wherein:
the drive means includes a motor means for rotating the synchronized eccentric means.

* * * * *